(12) United States Patent
Levinson et al.

(10) Patent No.: US 10,949,098 B2
(45) Date of Patent: Mar. 16, 2021

(54) METHOD AND APPARATUS FOR PROVIDING INCREASED STORAGE CAPACITY

(71) Applicant: R-STOR INC., Saratoga, CA (US)

(72) Inventors: Roger Levinson, Los Gatos, CA (US); Giovanni Coglitore, Saratoga, CA (US); Mario J. Paniccia, Santa Clara, CA (US)

(73) Assignee: R-STOR INC., Saratoga, CA (US)

( * ) Notice: Subject to any disclaimer, the term of this patent is extended or adjusted under 35 U.S.C. 154(b) by 163 days.

(21) Appl. No.: 15/428,826

(22) Filed: Feb. 9, 2017

(65) Prior Publication Data

US 2017/0228179 A1    Aug. 10, 2017

Related U.S. Application Data

(60) Provisional application No. 62/293,578, filed on Feb. 10, 2016.

(51) Int. Cl.
*G06F 3/06* (2006.01)
*G06F 13/40* (2006.01)
*G06F 11/16* (2006.01)

(52) U.S. Cl.
CPC .......... *G06F 3/0619* (2013.01); *G06F 3/065* (2013.01); *G06F 3/068* (2013.01); *G06F 3/0631* (2013.01); *G06F 11/167* (2013.01); *G06F 11/1654* (2013.01); *G06F 13/4022* (2013.01)

(58) Field of Classification Search
CPC ...... G06F 3/0619; G06F 3/065; G06F 3/0688; G06F 3/0683; G06F 3/0681; G06F 11/1654; G06F 11/067; G06F 11/2069; G06F 11/1469; G06F 11/2071; G06F 11/2097; G06F 11/1456
See application file for complete search history.

(56) References Cited

U.S. PATENT DOCUMENTS

| | | | | |
|---|---|---|---|---|
| 2008/0240093 | A1* | 10/2008 | Morad | H04L 49/90 370/389 |
| 2010/0049914 | A1* | 2/2010 | Goodwin | G06F 3/0626 711/114 |
| 2012/0110376 | A1* | 5/2012 | Dreifus | G11C 29/76 714/6.12 |
| 2012/0151254 | A1* | 6/2012 | Horn | G06F 11/108 714/6.22 |
| 2013/0163175 | A1* | 6/2013 | Kim | G06F 1/1658 361/679.32 |

(Continued)

*Primary Examiner* — Tracy A Warren
(74) *Attorney, Agent, or Firm* — Squire Patton Boggs (US) LLP

(57) ABSTRACT

Certain embodiments may relate to providing increased storage capacity. For instance, a memory storage device may include a motherboard with an external communication interface. The memory storage device may also include a multiple solid-state drives coupled to the motherboard in communication with the external communication interface. Each of the plurality of solid-state drives may include a respective storage controller to manage the distribution of data during a write or read operation to a combination of a primary storage allocation and a redundant storage allocation. The redundant storage allocation may be included in the combination in response to detecting an error condition associated with at least a portion of the primary storage allocation.

17 Claims, 14 Drawing Sheets

(56) References Cited

U.S. PATENT DOCUMENTS

| | | | |
|---|---|---|---|
| 2015/0277512 A1* | 10/2015 | Davis | G06F 1/183 |
| | | | 361/679.31 |
| 2015/0286438 A1* | 10/2015 | Simionescu | G06F 12/0866 |
| | | | 711/103 |
| 2016/0342476 A1* | 11/2016 | Nazari | G06F 12/0246 |
| 2017/0123915 A1* | 5/2017 | Nguyen | G06F 11/1092 |
| 2017/0168908 A1* | 6/2017 | Abali | G06F 11/2069 |

* cited by examiner

METHOD AND APPARATUS FOR PROVIDING INCREASED STORAGE CAPACITY

CROSS REFERENCE TO RELATED APPLICATION

This application claims priority to U.S. Provisional Application No. 62/293,578 filed on Feb. 10, 2016. The entire contents of the above-referenced provisional application in hereby incorporated by reference.

BACKGROUND

Field

Certain embodiments of the present invention relate to providing increased storage capacity.

Description of the Related Art

Digital information has been traditionally stored on hard disk drives. Hard disk drives may store digital information using at least one rotating disk that includes magnetic material. The digital information may written onto and read from the at least one rotating disk by a magnetic head. Because traditional hard disk drives typically use moving/mechanical components, these traditional hard disks would be prone to mechanical failure after extended use. Therefore, solid-state drives have become an increasingly popular replacement for hard disk drives. Solid-state drives are generally considered to be storage devices that store digital information using integrated circuit assemblies, without use of moving/mechanical components.

SUMMARY

One embodiment is directed to a memory storage device, which may include a motherboard with an external communication interface, and a plurality of solid-state drives coupled to the motherboard in communication with the external communication interface. Each of the plurality of solid-state drives may include a respective storage controller configured to manage the distribution of data during a write operation to a combination of a primary storage allocation and a redundant storage allocation. In addition, the redundant storage allocation may be included in the combination in response to detecting an error condition associated with at least a portion of the primary storage allocation.

According to an embodiment, a copy of the data from at least the portion of the primary storage allocation associated with the error condition may stored in the redundant storage allocation. According to another embodiment, when the error condition is detected, an address of at least the portion of the primary storage allocation associated with the error condition may be remapped to the redundant storage allocation. According to yet another embodiment, the error condition may be detected by interrogating at least the portion of the primary storage allocation associated with the error condition, and the interrogation may include determining if data was successfully written to at least the portion of the primary storage allocation associated with the error condition.

According to a further embodiment, the memory storage device may include a plurality of indicators associated with each of the plurality of solid-state drives. In an embodiment, the plurality of indicators may indicate an operating state of each of the plurality of solid-state drives. In another embodiment, the plurality of solid-state drives may be connected in rows on a first side of the motherboard and a second side of the motherboard by a plurality of connectors, and the plurality of connectors may be connected along an edge of the first side of the motherboard and connected along an edge of the second side of the motherboard. According to another embodiment, the motherboard may include a switch configured to receive data in accordance with a first bus standard, and to output the data received at the switch in accordance with the first bus standard as data in accordance with a second bus standard.

Another embodiment may be directed to a method for increasing storage capacity. The method may also include receiving data from an internal or external source. The method may further include managing the distribution of the data received from the internal or external source during a write operation to a combination of a primary storage allocation and a redundant storage allocation in each of a plurality of solid-state drives, and including the redundant storage allocation in the combination in response to detecting an error condition associated with at least a portion of the primary storage allocation.

According to an embodiment, the method may also include storing a copy of the data from at least the portion of the primary storage allocation in the redundant storage allocation. According to another embodiment, when the error condition is detected, the method may include remapping an address of at least the portion of the primary storage allocation associated with the error condition to the redundant storage allocation. According to a further embodiment, the method may include interrogating at least the portion of the primary storage allocation associated with the error condition. According to yet another embodiment, the interrogation may include determining if data was successfully written to at least the portion of the primary storage allocation associated with the error condition. According to a further embodiment, the plurality of solid-state drives may include a plurality of indicators, and the plurality of indicators may indicate an operating state of each of the plurality of solid-state drives. According to another embodiment, the method may include connecting the plurality of solid-state drives to a motherboard in rows on a first side of the motherboard and a second side of the motherboard. In an embodiment, the plurality of solid-state drives may be connected to the motherboard by a plurality of connectors that are connected along an edge of the first side of the motherboard and connected along an edge of the second side of the motherboard opposite the first edge.

Another embodiment may be directed to a memory storage device that includes a motherboard with an external communication interface, and a plurality of solid-state drives coupled to the motherboard in communication with the external communication interface. Each of the plurality of solid-state drives may include a respective storage controller configured to manage the distribution of data during a read operation from a combination of a primary storage allocation and a redundant storage allocation. Further, the redundant storage allocation may be included in the combination in response to detecting an error condition associated with at least a portion of the primary storage allocation.

According to an embodiment, a copy of the data from at least the portion of the primary storage allocation may be associated with the error condition is stored in the redundant storage allocation. According to another embodiment, when the error condition is detected, an address of at least the portion of the primary storage allocation associated with the error condition may be remapped to the redundant storage allocation. According to yet another embodiment, the error condition may be detected by interrogating at least the portion of the primary storage allocation associated with the error condition. According to a further embodiment, the interrogation may include determining if data was successfully read from at least the portion of the primary storage allocation associated with the error condition.

According to an embodiment, the memory storage device may include a plurality of indicators associated with each of the plurality of solid-state drives. The plurality of indicators may indicate an operating state of each of the plurality of solid-state drives. According to another embodiment, the plurality of solid-state drives may be connected in rows on a first side of the motherboard and a second side of the motherboard by a plurality of connectors, and the plurality of connectors may be connected along an edge of the first side of the motherboard and connected along an edge of the second side of the motherboard opposite the first edge. According to yet another embodiment, the motherboard may include a switch configured to receive data in accordance with a first bus standard, and to output the data received at the switch in accordance with the first bus standard as data in accordance with a second bus standard.

An apparatus, in certain embodiments, may include means for receiving data from an internal or external source. The apparatus may also include mans for managing the distribution of the data received from the internal or external source during a write operation to a combination of a primary storage allocation and a redundant storage allocation. The apparatus may further include means for including the redundant storage allocation in the combination in response to detecting an error condition associated with at least a portion of the primary storage allocation. The apparatus may further include means for storing a copy of the data from at least the portion of the primary storage allocation in the redundant storage allocation.

The apparatus may also include means for, when the error condition is detected, remapping an address of at least the portion of the primary storage allocation associated with the error condition to the redundant storage allocation. The apparatus may further include means for interrogating at least the portion of the primary storage allocation associated with the error condition, where the interrogation may include determining if data was successfully written to at least the portion of the primary storage allocation associated with the error condition. The apparatus may also include means for connecting the plurality of solid-state drives to a motherboard in rows on a first side of the motherboard and a second side of the motherboard, where the plurality of solid-state drives may be connected to the motherboard by a plurality of connectors that are connected along an edge of the first side of the motherboard, and connected along an edge of the second side of the motherboard.

BRIEF DESCRIPTION OF THE DRAWINGS

For proper understanding of the invention, reference should be made to the accompanying drawings, wherein.

DETAILED DESCRIPTION

Figure 1:
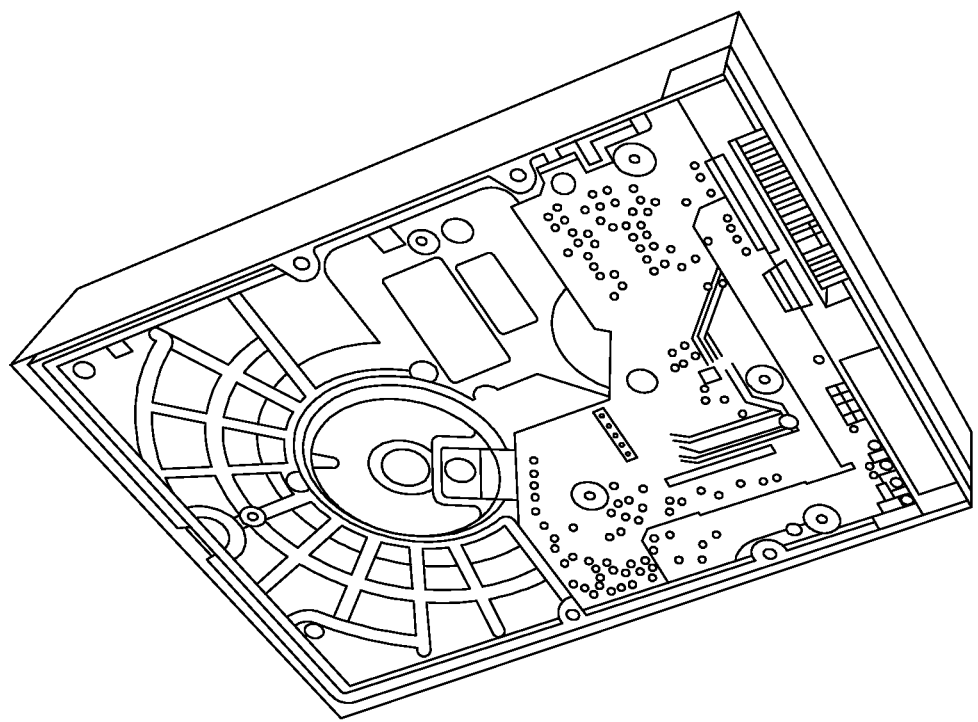
FIG. 1 illustrates a conventional 3.5 hard disk drive.

Certain embodiments of the present invention increase the amount of storage capacity that is contained within a standard form factor, and allow for multiple SSD drives to be disposed on a single carrier, such as a motherboard. Other embodiments allow for improved and more efficient management of storage capacity in a memory storage device. Certain embodiments may be directed to a modular solution that is inexpensive to maintain and upgrade. The standard form factor may correspond to the size of a conventional hard disk drive, for example. FIG. 1 illustrates a conventional 3.5 inch hard disk drive. The size of the conventional 3.5 inch hard disk drive may serve as a standard form factor upon which certain embodiments are based upon, as described in more detail below. Although a 3.5-inch form factor is specifically mentioned above, other embodiments may use a 2.5-inch or some other form factor.

Certain embodiments of the present invention affix a plurality of solid-state drives (SSD) on a motherboard. For example, certain embodiments may affix a plurality of M.2 SSD drives on a motherboard. The SSD drives and the motherboard may fit within a standard 3.5" or 2.5" form factor. Other embodiments may fit within a smaller form factor. With certain embodiments, the dimensions of the motherboard may be configured such that the motherboard can be easily connected within a standardized 3.5" or 2.5" SSD enclosure.

Figure 2:
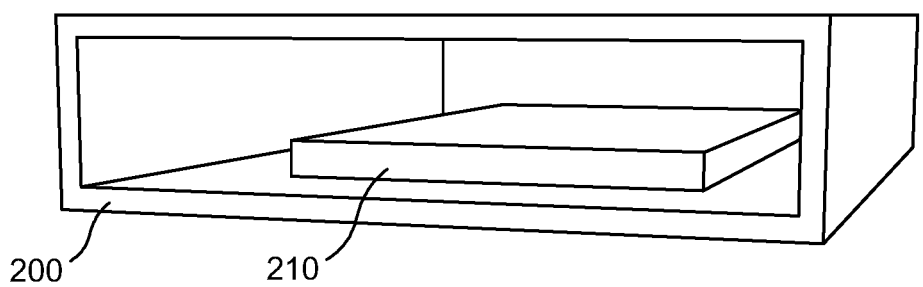
FIG. 2 illustrates a housing with dimensions that correspond to the housing of a 3.5 hard disk drive, in accordance with certain embodiments of the present invention.

FIG. 2 illustrates a housing 200 with dimensions that correspond to the housing 200 of a 3.5 inch hard disk drive, in accordance with certain embodiments of the present invention. A memory storage device of certain embodiments may be fitted within the housing 200 of FIG. 2. As described above, with certain embodiments, the SSD drives and the motherboard may fit within the housing 200 of FIG. 2, for example. The housing 200 of FIG. 2 may also include a platform/protrusion 210 that may support the memory storage device, once the memory storage device is inserted into the housing 200. Referring to the housing of FIG. 2, the dimensions of the housing 200 may be 147 mm×101.6×26.1 mm, for example. Other embodiments may have other dimensions. With certain embodiments, the housing 200 of FIG. 2 may have an open face or an opening that allows for the memory storage device to connect to a computing device/network. The memory storage device may store data and files which are received from the computing device/network to which the memory storage device is connected. Although FIG. 2 illustrates a memory storage device that is fitted in a housing, other embodiments may not be fitted in any housing.

Figure 3:
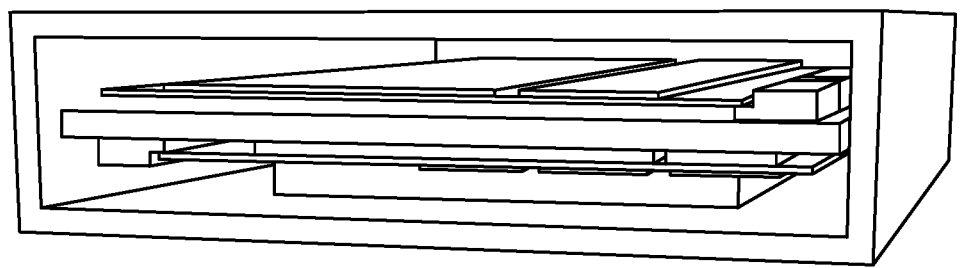
FIG. 3 illustrates inserting a memory storage device into a housing, in accordance with certain embodiments of the present invention.

FIG. 3 illustrates inserting a memory storage device into a housing, in accordance with certain embodiments of the present invention. Different embodiments may be directed to different ways to physically orient the SSD drives and the motherboard within the housing.

Figure 4:
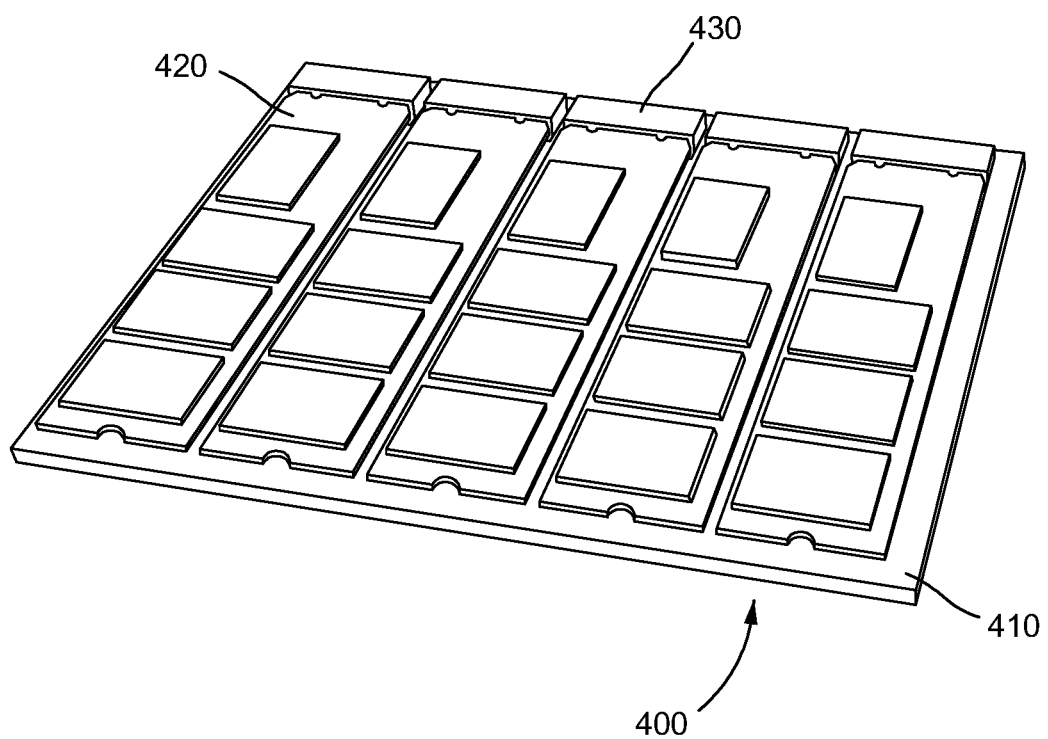
FIG. 4 illustrates a motherboard of a memory storage device, in accordance with certain embodiments of the present invention.

FIG. 4 illustrates a motherboard 410 of a memory storage device 400, in accordance with certain embodiments of the present invention. In one embodiment, a plurality of SSD drives 420 (such as M.2 SSD drives, for example) may be configured on each side of the motherboard 410. With certain embodiments, M.2 SSD drives (420) may be arranged in rows on motherboard 410. For example, with one embodiment, 5 M.2 SSD drives (420) are loaded on each side of the motherboard 410. Although certain embodiments may have a total of 10 M.2 SSD drives, other embodiments may have a total of 5 M.2 SSD drives. Further, other embodiments may have any number of M.2 SSD drives as desired. The M.2 SSD drives (420) may be loaded on each side of the motherboard 410 using standard M.2 connectors (430). The M.2 connectors (430) may be configured on a top side of the motherboard 410, along one edge. The connectors may be configured on a bottom side of the motherboard, along an opposite edge, in order to facilitate signal and power routing. The connectors on the top side of the motherboard may be arranged along an opposite edge as compared to the connectors on the bottom side of the motherboard because such an arrangement may simplify the routing paths of the signals within the motherboard, avoiding complexity within the routing. Referring to the example of FIG. 4, the connectors 430 are configured along the longer edge (i.e., the 125 mm edge) of motherboard 410. However, other embodiments may configure connectors 430 along the shorter edge (i.e., the 90 mm edge) of motherboard 410.

In the example of FIG. 4, the total thickness of the memory storage device 400 can be determined as follows: 3.2 mm (thickness of SSD drive)+3.2 mm (thickness of SSD drive)+3 mm (thickness of motherboard). As such, a housing with a height that is greater than 20 mm is likely to be sufficient for containing memory storage device 400. Without taking thermal dissipation into consideration, there may be space within the housing for two stacks of the memory storage device 400. Other embodiments may use different dimensions for the components/housing.

As described above, one example motherboard may have dimensions of 125 mm×90 mm. Other embodiments may use a larger motherboard to include on-board components such as a switch integrated circuit (IC), a connector, etc. The space that is available for the SSD motherboard may depend on a housing thickness, a connector space, and the amount of space that is necessary for thermal dissipation.

Figure 5:
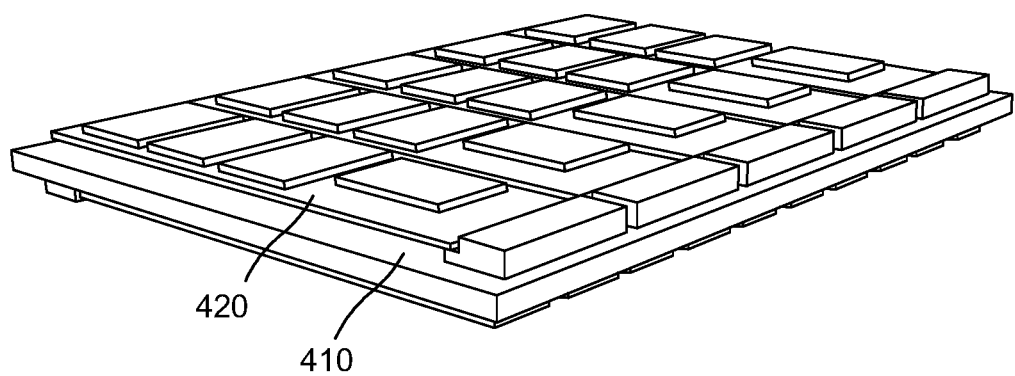
FIG. 5 illustrates a top view of a motherboard of a solid-state device, in accordance with certain embodiments of the present invention.

FIG. 5 illustrates a top view of a motherboard of a memory storage device 400, in accordance with certain embodiments of the present invention. With certain embodiments, the SSD drives 420 (such as M.2 drives, for example) may be suspended several millimeters above or below the motherboard, allowing motherboard electronics to be mounted on the motherboard, between the motherboard 410 and the suspended M.2 drives 420. With certain embodiments, a unique connector (not shown) may hold the unconnected ends of the M.2 drives in place. The connector may include a pogo pin, a spring, and/or a latch, for example. By holding the unconnected ends in place, certain embodiments may facilitate easier installation and easier removal.

Figure 6:
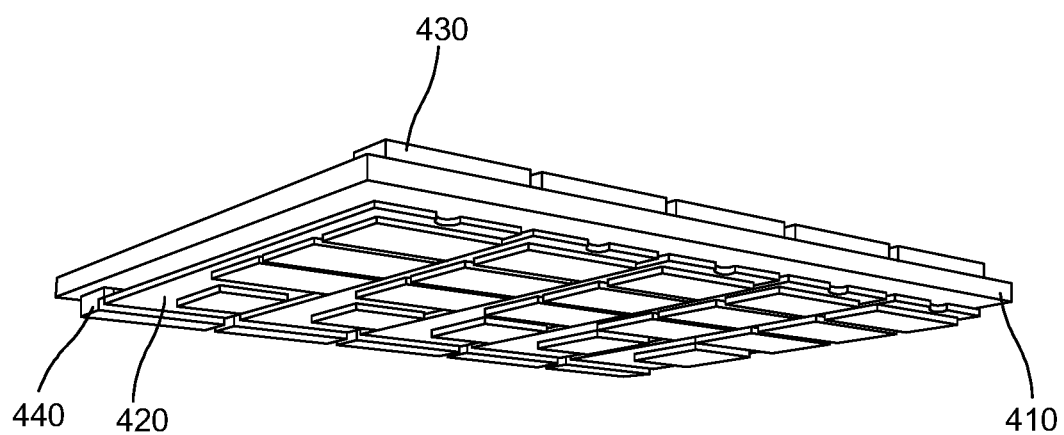
FIG. 6 illustrates a bottom view of a motherboard of a solid-state device, in accordance with certain embodiments of the present invention.

FIG. 6 illustrates a bottom view of a motherboard 410 of a memory storage device 400, in accordance with certain embodiments of the present invention. With certain embodiments, SSD drives 420 may be placed/affixed to both the top and bottom surfaces of motherboard 410. Referring to FIG. 6, the connectors 430 on the top surface may be arranged along a side that is opposite the side to which the connectors 440 are arranged on the bottom surface.

Figure 7:
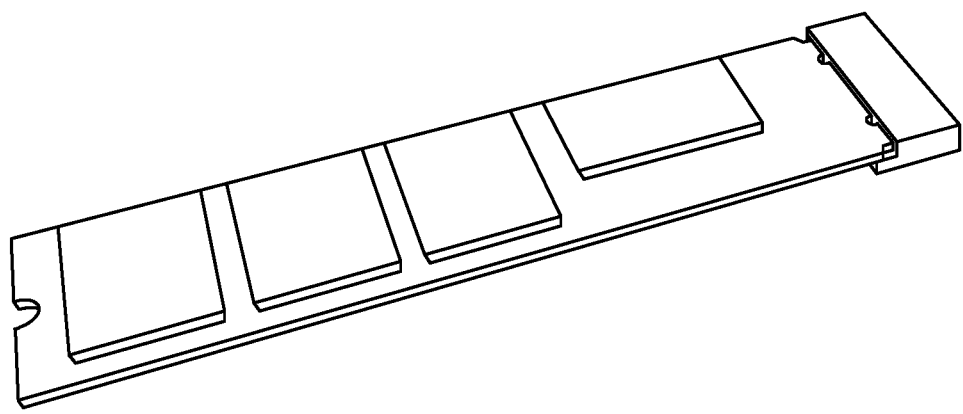
FIG. 7 illustrates an example M.2 module of a memory storage device, in accordance with certain embodiments of the present invention.

FIG. 7 illustrates an example M.2 module of a memory storage device 700, in accordance with certain embodiments of the present invention. Although M.2 SSD has been specifically described above, other embodiments of the present invention may use different types of SSD drives. Other embodiments may possibly use non-volatile technology such as 3D Xpoint, Conductive-bridging Random-Access Memory, Silicon-Oxide-Nitride-Oxide Silicon memory, Resistive Random-Access Memory, Racetrack memory, and/or Nano-RAM, for example. Other embodiments may use Flash memory, for example.

With certain embodiments, a modular design allows a user to easily replace existing drives with little to no reworking. Additionally, certain embodiments may facilitate easy maintenance of the SSD drives (i.e., M.2 drives). Certain embodiments may facilitate easy maintenance of the M.2. drives by including visual indicators (such as Light Emitting Diode lights) to indicate a good state (such as by using a green light, for example) or to indicate bad state (such as by using a red light, for example). Each M.2 drive may be associated with an LED, where each LED indicates the state of its associated M.2 drive. As such, with certain embodiments of the present invention, a simple visual inspection may be sufficient to identify any technical problems, at the M.2 or at the mother-board level. Thus, certain embodiments may facilitate easy replacement of the M.2. drives. Further, certain embodiments may include management software that provides details on the condition and status of each drive.

Figure 8:
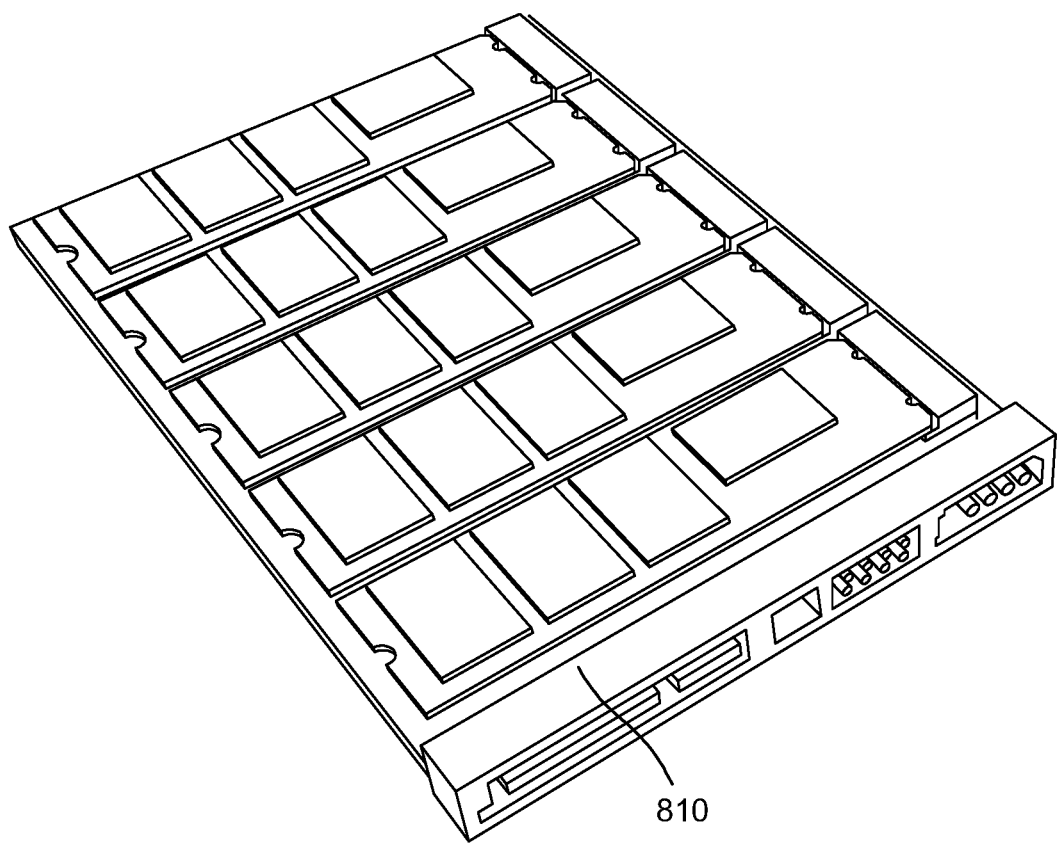
FIG. 8 illustrates an example edge connector, in accordance with certain embodiments of the present invention.
Figure 10:
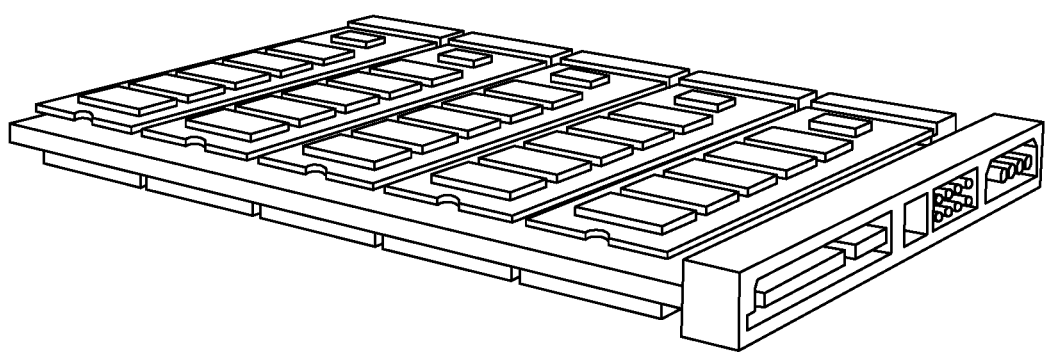
FIG. 10 illustrates another view of an example edge connector.

FIG. 8 illustrates an example edge connector 810, in accordance with certain embodiments of the present invention. The edge connector 810 may allow the memory storage device 400 (which includes a motherboard and a plurality of SSD drives) to appear as one drive, which fits the form factor of a conventional hard disk drive, for example. In other words, edge connector 810 may act as an interface that allows memory storage device 400 to seamlessly interact with the rest of the system. FIG. 10 illustrates another view of an example edge connector 810.

Figure 9:
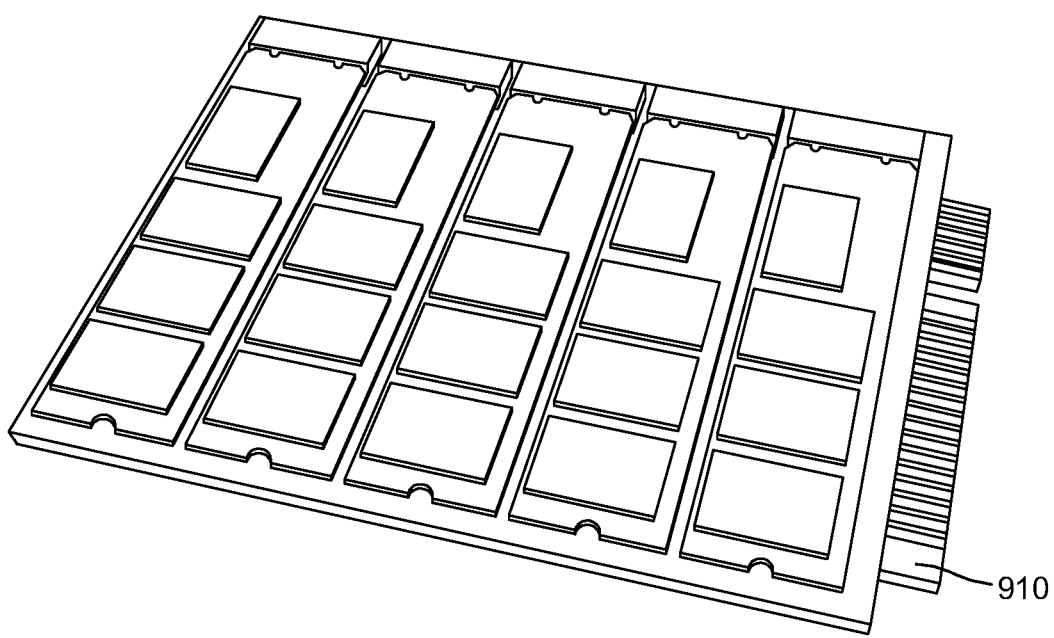
FIG. 9 illustrates a gold finger, in accordance with certain embodiments of the present invention.
Figure 11:
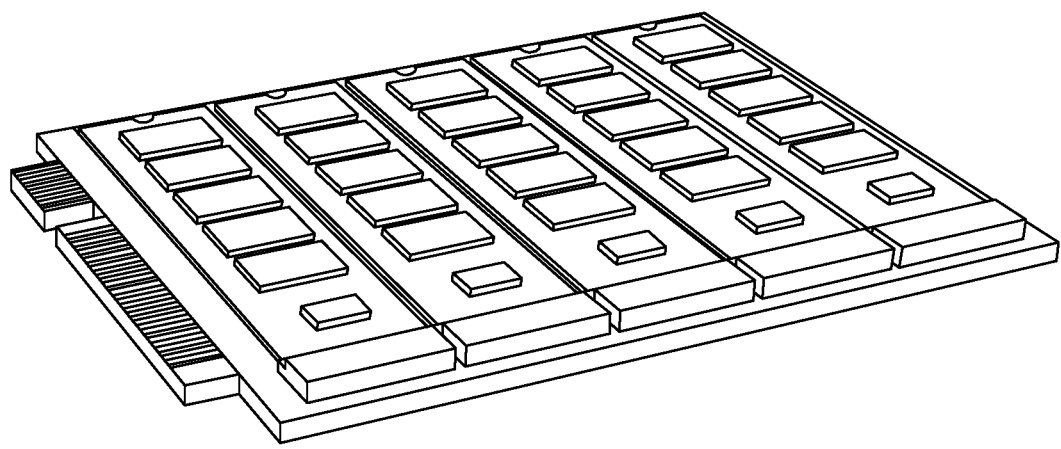
FIG. 11 illustrates another view of a gold finger.

FIG. 9 illustrates a gold finger 910, in accordance with certain embodiments of the present invention. The gold finger 910 may allow the memory storage device 400 (which includes a motherboard and a plurality of SSD drives) to appear as one drive, which fits the form factor of a conventional hard disk drive, for example. In other words, gold finger 910 may act as an interface that allows memory storage device 400 to seamlessly interact with the rest of the system. FIG. 11 illustrates another view of a gold finger 910.

With certain embodiments, the drives may be electrically interconnected using either a Peripheral Component Interconnect Express (PCIe) or Non-Volatile Memory Express (NVMe) connectivity matrix, a M-SATA connectivity, or even an Ethernet.

Figure 12:
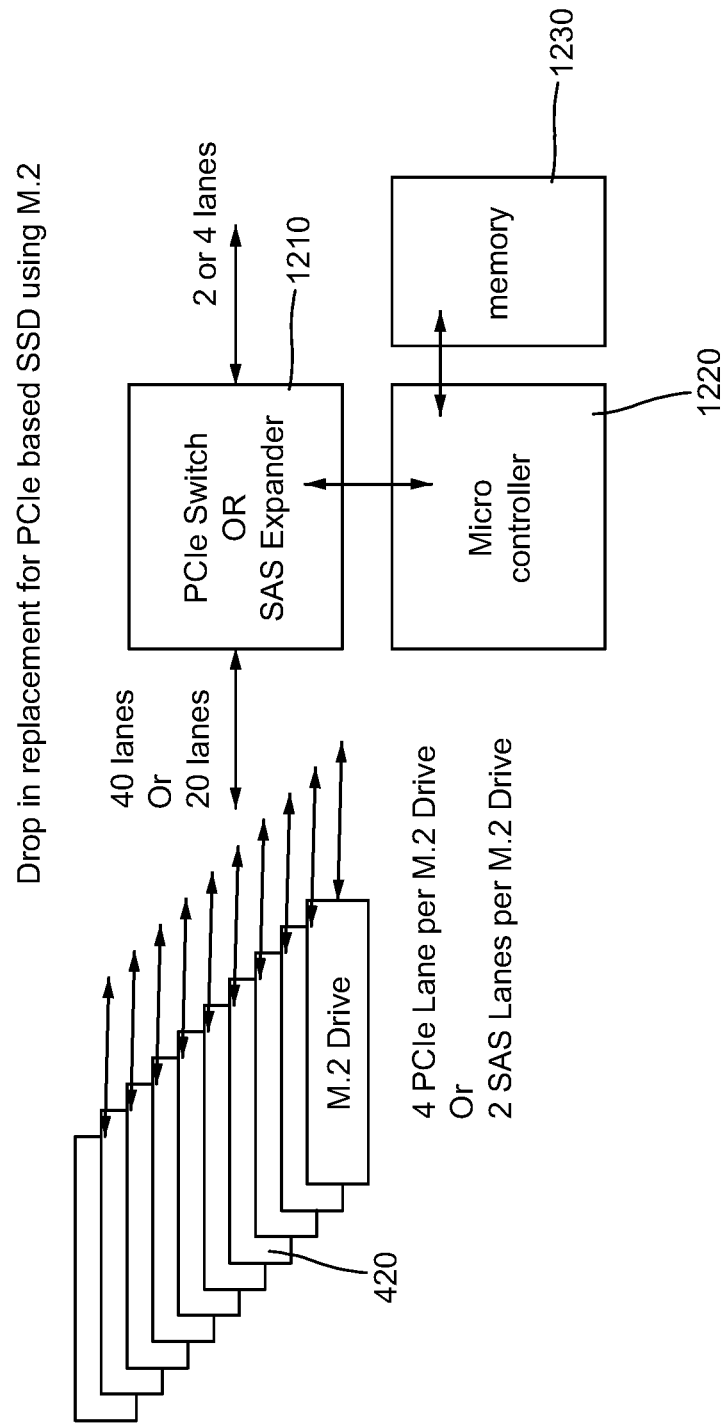
FIG. 12 illustrates on-board electronics of certain embodiments of the present invention.

FIG. 12 illustrates on-board electronics of certain embodiments of the present invention. As described above, with certain embodiments, the on-board electronics may be configured on motherboard 410, for example. Certain embodiments may include on-board electronics that enable the plurality of M.2 drives (420) to emulate a single SSD drive. The on-board electronics may interface with each M.2 drive. With embodiments that utilize PCIe, PCIe-based M.2 drives may be used, and a Switch 1210 may be used to select which M.2 drive is selected for a particular read/write operation. Certain embodiments may use a microcontroller 1220 to manage a data flow and to manage switch selections. In other embodiments, the microcontroller 1220 may be affixed to the motherboard 410, or the microcontroller may be external to the motherboard 410.

In certain embodiments, the individual drives, such as M.2 form factor drives, can utilize a variety of PCIe lanes or SAS lanes. FIG. 12 illustrates an embodiment with either 4 or 2 lane M.2 drives, as these are industry standard available devices. An additional embodiment would utilize only a single PCIe lane from each M.2 drive. Because there is a bandwidth constraint due to the switch function 1210, as the number of M.2 drives increases, the efficiency of data flow as measured in input/output operations per second can be impacted if there are too many lanes from each M.2 drive. For example, with a switch 1210 that has 4 upstream lanes of PCIe Gen 3 at 8 Gbps, there is a total bandwidth of 32 Gbps. With 10 M.2 drives, a single lane of PCIe 3 from each drive would generate 80 Gbps. So, to maximize efficiency and usage of all of the drives, a single PCIe lane from each M.2 is all that may be necessary. This is a unique embodiment of the M.2 type of drive or of any other drive.

With certain embodiments, Switch 1210, in conjunction with another chip (such as an I/O controller, for example), may provide a conversion between different bus standards. For example, in one embodiment, switch 1210 (along with an I/O controller) may receive data in accordance with the PCI/PCIe standard, and then output the data in accordance with the SAS/SATA standard. The outputted data may then be stored in M.2 drives. The I/O controller may also receive the data on a first number of lanes (i.e., 2 or 4 lanes) and output the data on a second number of lanes (i.e., 20 or 40 lanes). The first number of lanes may correspond to the connections with the external computing device/network that provides the data to be stored on the SSD drives. The second number of lanes may correspond to the connections with the M.2 drives.

With certain embodiments, switch 1210 (and corresponding microcontroller 1220 and memory 1230) may be on-board electronics located on motherboard 410, or may be configured external to motherboard 410.

Certain embodiments may be directed to an embodiment that integrates a Serial-Attached-Small-Computer-System-Interface (SAS) expander and adapter. Embodiments that use Serial Attached Small-Computer-System-Interface (SAS) or Serial Advance Transfer Attachment (SATA) may use a similar configuration where a SAS expander device is utilized to take in the 2 SAS ports, and to redirect read/write data from/to each of the individual M.2 drives. These embodiments may provide a unique solution in that multiple drives may be integrated into a single drive footprint, and all of the drive management may be integrated to make for a seamless replacement. The integration of the SAS expander and adapter into the unit may result in significant savings for users, where these users would typically have to include this function externally to the drives and manage this function themselves.

With certain embodiments, each of the SSD drives (such as M.2 NAND memory sticks, for example) may include three main components: (1) at least one storage component (such as at least one NAND chip, for example), (2) a redundant or back-up storage, (3) and a storage controller. The storage controller may manage how data is written to the various NAND chips, and may manage errors. For example, if there is a NAND Integrated Circuit (IC) that goes "bad" or fails that is detected by the storage controller, the storage controller may utilize the extra/redundant storage IC. For example, with a 1 TB M.2 drive that contains 1.2 TB of actual storage capacity, the extra 0.2 TB (20%) may not be directly available to the system and may be used as redundant storage to ensure a reliable 1 TB capacity at all times.

In other embodiments, an NAND IC goes "bad" or fails when data stored or written on the NAND IC that is read back to the storage controller does not properly match a copy of the data stored in the storage controller. In such a case, the storage controller may try to write or store the data on the NAND IC a second time, or try more than a second time in other embodiments. If writing or storing the data on the NAND IC continues to fail, the storage controller may write or store the data in the redundant storage.

According to certain embodiments, the data stored on the NAND IC may also be stored on at least one other NAND IC of at least one other M.2 drive. Thus, when one M.2 drive with the data stored therein fails, is unreadable, or the data has poor integrity, that particular M.2 drive may be replaced with a new M.2 drive and the same data stored on the failed M.2 drive may be retrieved from the redundant storage of another M.2 drive. According to such embodiments, it may be possible therefore to retrieve or recover data from a failed M.2 drive or failed NAND IC without having to replace all of the M.2 drives on the motherboard, and only the failed M.2 drive may be replaced with another M.2 drive. According to such embodiments, it may further be possible to have redundancy built into one single unit, such as the motherboard with the M.2 drives affixed thereto.

As described above, certain embodiments of the present invention may combine a plurality of drives (such as multiple M.2 drives, for example) to create a single unit. Each of these drives contains redundant storage and each of the drives individually controls the use of this extra storage.

Because certain embodiments combine a plurality of drives, certain embodiments may take advantage of the 20% excess storage because it is unlikely that all the individual drives (such as individual M.2s) in the combined plurality of drives will require the redundant back-up memory. As such, certain embodiments may utilize software running in the drive controller of the M.2 drive to manage the redundant memory usage for all of the M.2s, and only utilize a subset of the available excess memory for performing the function of redundant back-up. The remainder of what was originally redundant memory may be available to be used as regular-purposed memory, thus increasing the capacity of the total unit.

For example, with a plurality of drives including, for example, 10 1 TB M.2 drives, each of the 1 TB M.2 drive may contain 0.2 TB of excess, redundant NAND. The usable capacity of the total plurality of drives could be increased to 10 TB+(9×0.2 TB)=11.8 TB, while only one of the M.2 excess 0.2 TB is reserved as redundant backup for the entire plurality of drives. The additional software would interrogate each of the individual M.2 controllers to determine if there are any error sectors on each of the M.2s. Alternatively, in other embodiments, the additional software may be implemented by the storage controller to interrogate each storage component of the SSD drives to determine if there are any error sectors. If an error sector is found, that sector's address space would be remapped to the allocated redundant M.2 memory.

Figure 13:
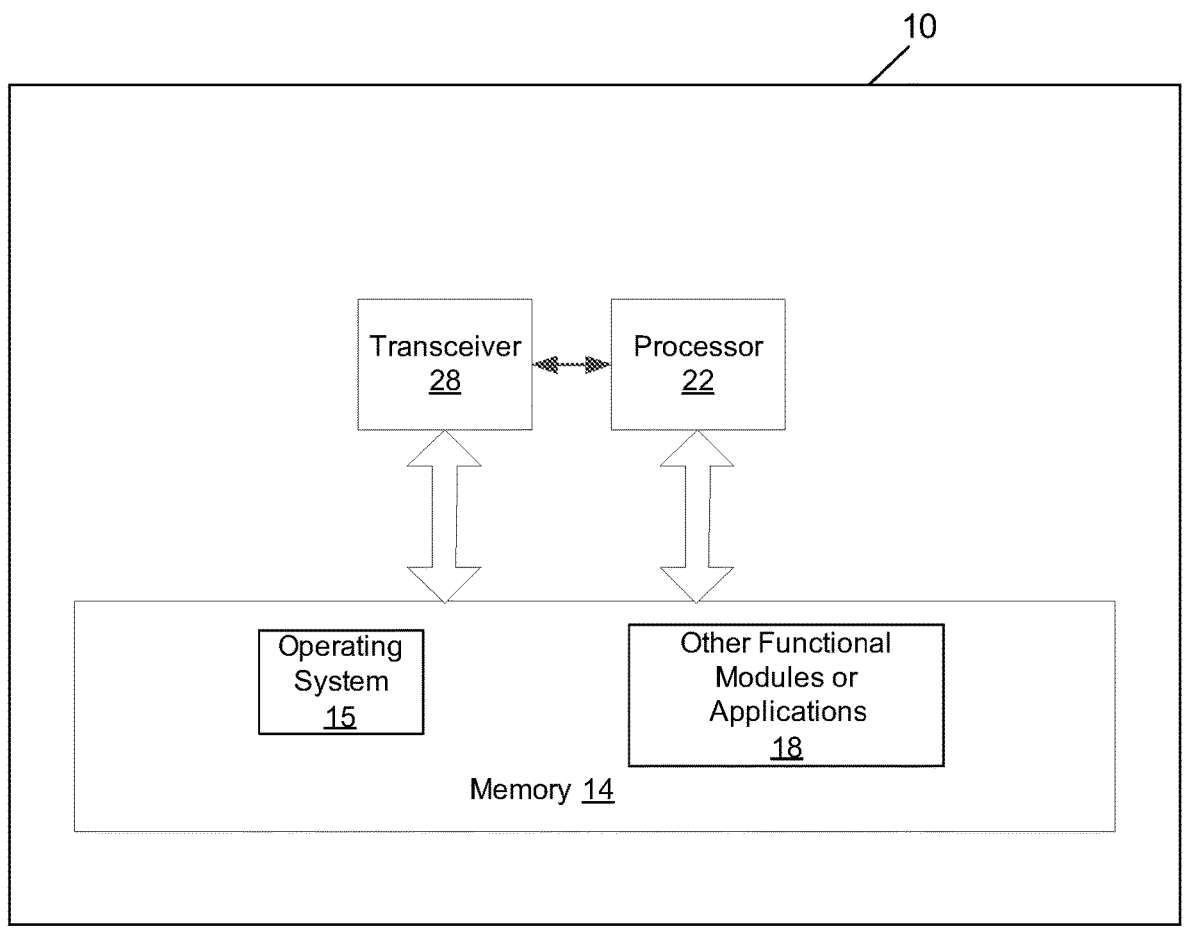
FIG. 13 illustrates an apparatus in accordance with certain embodiments of the invention.

FIG. 13 illustrates an apparatus in accordance with certain embodiments of the invention. In one embodiment, the apparatus can be an individual SSD controller or a controller of the motherboard electronics, for example. Apparatus 10 can include a processor 22 for processing information and executing instructions or operations. Processor 22 can be any type of general or specific purpose processor. While a single processor 22 is shown in FIG. 13, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein. Alternatively, in other embodiments, the processes and tasks described herein may be performed entirely in hardware. Additionally, according to certain embodiments, apparatus 10 may include means for carrying out embodiments described herein, such as, but not limited to, those shown in FIGS. 12 and 14.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly using fiber optics and/or copper.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 14:
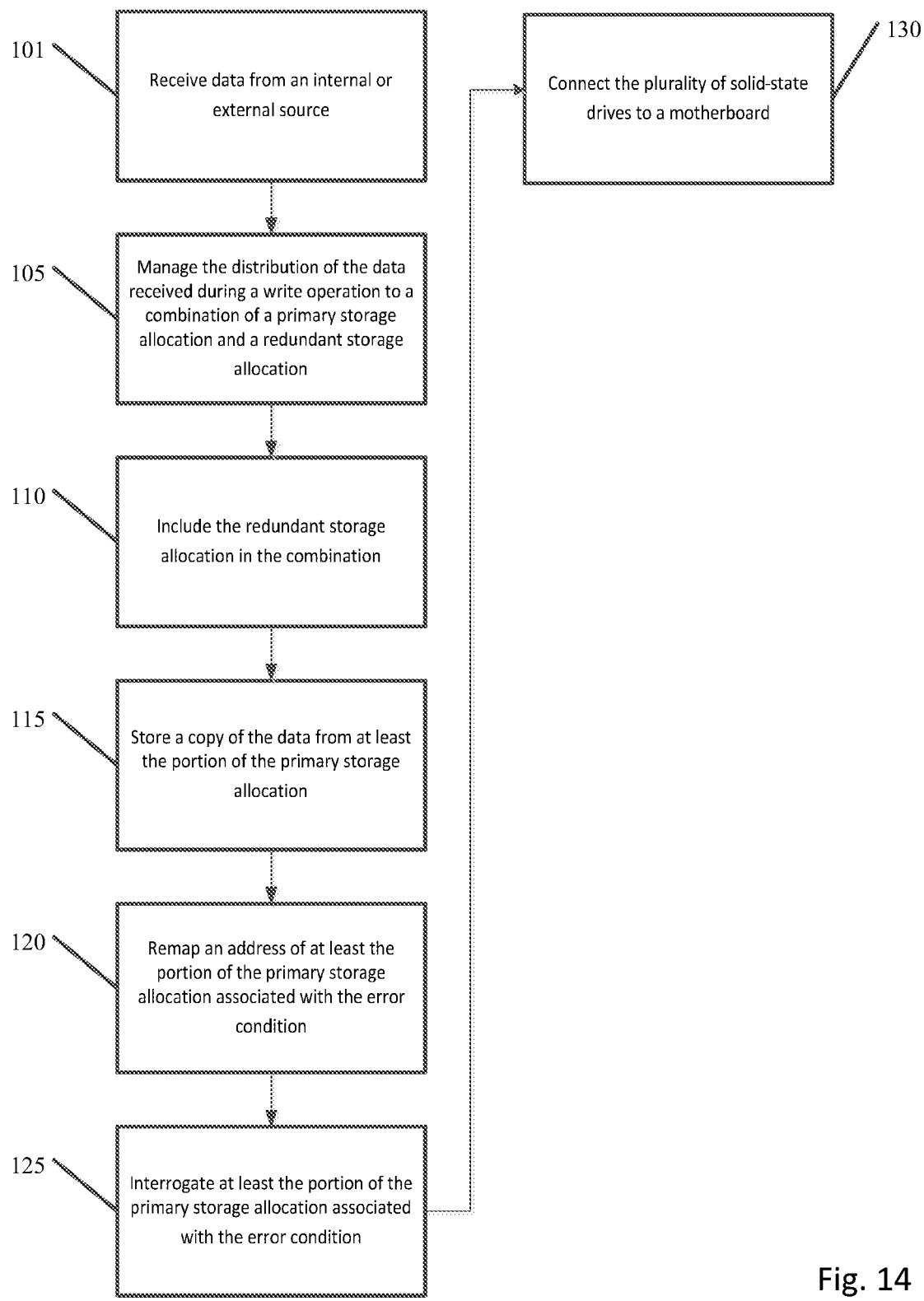
FIG. 14 illustrates a flow diagram in accordance with certain embodiments of the invention.

FIG. 14 illustrates a flow diagram of a method for increasing storage capacity according to certain embodiments. According to certain embodiments, the method steps of the flow diagram may be implemented by the apparatus 10 described above. For example, at 101, the method may include receiving data from an internal or external source. At 105, the method may include managing the distribution of the data received from the internal or external source during a write operation to a combination of a primary storage allocation and a redundant storage allocation. In other embodiments, the management of the distribution of the data received may be during a read operation. At 110, the method may include including the redundant storage allocation in the combination in response to detecting an error condition associated with at least a portion of the primary storage allocation.

At 115, the method may include storing a copy of the data from at least the portion of the primary storage allocation in the redundant storage allocation. Further, at 120, the method may include, when the error condition is detected, remapping an address of at least the portion of the primary storage allocation associated with the error condition to the redundant storage allocation. In addition, at 125, the method may include interrogating at least the portion of the primary storage allocation associated with the error condition. In certain embodiments, the interrogation may include determining if the data was successfully written to at least the portion of the primary storage allocation associated with the error condition. Further, at 130, the method may include connecting the plurality of solid-state drives to a motherboard in rows on a first side of the motherboard and a second side of the motherboard. In certain embodiments, the plurality of solid-state drives may be connected to the motherboard by a plurality of connectors that are connected to an edge of the first side of the motherboard and connected along an edge of the second side of the motherboard.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A memory storage device, comprising:
   a motherboard with an external communication interface; and
   a plurality of solid-state drives coupled to the motherboard in communication with the external communication interface,
   wherein each of the plurality of solid-state drives includes a respective storage controller configured to manage the distribution of data during a write operation to a combination of a primary storage allocation and a redundant storage allocation in each of the plurality of solid-state drives, and configured to detect an error condition associated with at least a portion of a primary storage allocation of a first solid-state drive of the plurality of solid-state drives, wherein prior to the error condition being detected, a copy of the data from at least the portion of the primary storage allocation of the first solid-state drive is stored in a second redundant storage allocation of a second solid-state drive of the plurality of solid-state drives, and wherein, in response to detecting an error condition associated with the at least one portion of the primary storage allocation, the controller is configured to retrieve the copy of the data from the second redundant storage allocation.

2. The memory storage device according to claim 1, wherein when the error condition is detected, an address of at least the portion of the primary storage allocation associated with the error condition is remapped to the redundant storage allocation.

3. The memory storage device according to claim 1, wherein the error condition is detected by interrogating at least the portion of the primary storage allocation associated with the error condition, and wherein the interrogation includes determining if data was successfully written to at least the portion of the primary storage allocation associated with the error condition.

4. The memory storage device according to claim 1, further comprising a plurality of indicators associated with each of the plurality of solid-state drives, wherein the plurality of indicators indicate an operating state of each of the plurality of solid-state drives.

5. The memory storage device according to claim 1, wherein the plurality of solid-state drives are connected in rows on a first side of the motherboard and a second side of the motherboard by a plurality of connectors, and wherein the plurality of connectors are connected along an edge of the first side of the motherboard and connected along an edge of the second side of the motherboard opposite the first edge.

6. The memory storage device according to claim 1, wherein the motherboard comprises a switch configured to receive data in accordance with a first bus standard, and to output the data received at the switch in accordance with the first bus standard as data in accordance with a second bus standard.

7. A method for increasing storage capacity, comprising:
receiving data from an internal or external source;
managing the distribution of the data received from the internal or external source during a write operation to a combination of a primary storage allocation and a redundant storage allocation in each of a plurality of solid-state drives;
detecting an error condition associated with at least a portion of a primary storage allocation of a first solid-state drive of the plurality of solid state drives;
storing, prior to an error condition being detected, a copy of the data from at least the portion of the primary storage allocation of the first solid-state drive in a second redundant storage allocation of detected second solid-state drive of the plurality of solid-state drives; and
in response to detecting an error condition associated with the at least one portion of the primary storage allocation, retrieving the copy of the data from the second redundant storage allocation.

8. The method according to claim 7, further comprising, when the error condition is detected, remapping an address of at least the portion of the primary storage allocation associated with the error condition to the redundant storage allocation.

9. The method according to claim 7, further comprising interrogating at least the portion of the primary storage allocation associated with the error condition, wherein the interrogation includes determining if data was successfully written to at least the portion of the primary storage allocation associated with the error condition.

10. The method according to claim 7, wherein the plurality of solid-state drives includes a plurality of indicators, and wherein the plurality of indicators indicate an operating state of each of the plurality of solid-state drives.

11. The method according to claim 7, further comprising connecting the plurality of solid-state drives to a motherboard in rows on a first side of the motherboard and a second side of the motherboard, wherein the plurality of solid-state drives are connected to the motherboard by a plurality of connectors that are connected along an edge of the first side of the motherboard and connected along an edge of the second side of the motherboard opposite the first edge.

12. A memory storage device, comprising:
a motherboard with an external communication interface; and
a plurality of solid-state drives coupled to the motherboard in communication with the external communication interface,
wherein each of the plurality of solid-state drives includes a respective storage controller configured to manage the distribution of data during a read operation from a combination of a primary storage allocation and a redundant storage allocation in each of the plurality of solid-state drives, and configured to detect an error condition associated with at least a portion of a primary storage allocation of a first solid-state drive of the plurality of solid-state drives,
wherein prior to the error condition being detected, a copy of the data from at least the portion of the primary storage allocation of the first solid-state drive is stored in a second redundant storage allocation of a second solid-state drive of the plurality of solid state drives, and
wherein, in response to detecting an error condition associated with the at least one portion of the primary storage allocation, the controller is configured to retrieve the copy of the data from the second redundant storage allocation.

13. The memory storage device according to claim 12, wherein when the error condition is detected, an address of at least the portion of the primary storage allocation associated with the error condition is remapped to the redundant storage allocation.

14. The memory storage device according to claim 12, wherein the error condition is detected by interrogating at least the portion of the primary storage allocation associated with the error condition, and wherein the interrogation includes determining if data was successfully read from at least the portion of the primary storage allocation associated with the error condition.

15. The memory storage device according to claim 12, further comprising a plurality of indicators associated with each of the plurality of solid-state drives, wherein the plurality of indicators indicate an operating state of each of the plurality of solid-state drives.

16. The memory storage device according to claim 12, wherein the plurality of solid-state drives are connected in rows on a first side of the motherboard and a second side of the motherboard by a plurality of connectors, and wherein the plurality of connectors are connected along an edge of the first side of the motherboard and connected along an edge of the second side of the motherboard opposite the first edge.

17. The memory storage device according to claim 12, wherein the motherboard comprises a switch configured to receive data in accordance with a first bus standard, and to output the data received at the switch in accordance with the first bus standard as data in accordance with a second bus standard.

\* \* \* \* \*